(12) United States Patent
Bacthu et al.

(10) Patent No.: US 10,284,472 B2
(45) Date of Patent: May 7, 2019

(54) DYNAMIC AND COMPRESSED TRIE FOR USE IN ROUTE LOOKUP

(71) Applicant: CISCO TECHNOLOGY, INC., San Jose, CA (US)

(72) Inventors: Nataraj Bacthu, Sunnyvale, CA (US); Ayan Banerjee, Fremont, CA (US); Raghava Sivaramu, Fremont, CA (US); Ankan Ghosh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 152 days.

(21) Appl. No.: 15/414,589

(22) Filed: Jan. 24, 2017

(65) Prior Publication Data
US 2018/0212876 A1 Jul. 26, 2018

(51) Int. Cl.
*H04L 12/745* (2013.01)
*H04L 12/743* (2013.01)

(52) U.S. Cl.
CPC ........ *H04L 45/748* (2013.01); *H04L 45/7457* (2013.01)

(58) Field of Classification Search
CPC ............... H04L 45/748; H04L 45/7457; H04L 61/2007
See application file for complete search history.

(56) References Cited

U.S. PATENT DOCUMENTS

| 6,385,649 | B1 | 5/2002 | Draves et al. |
| 8,625,604 | B2 | 1/2014 | Bando et al. |
| 8,923,298 | B2 | 12/2014 | Wang et al. |
| 9,331,942 | B2 | 5/2016 | Wang et al. |
| 2004/0111395 | A1* | 6/2004 | Rajgopal ........... G06F 17/30985 |

OTHER PUBLICATIONS http://ip.com/IPCOM/000247555, "Algorithm and Architecture for Longest Prefix Match on IP Addresses", S. Dharmapurikar et al., Sep. 16, 2016.
M.Bando et al,"Flash Trie:Hash-based Prefix-Compressed Trie for IP Route Lookup Beyond 100Gbps",Dept.Electrical and Comp Engineering,Polytechnic Institute of NYU, NY 2010.

* cited by examiner

*Primary Examiner* — Jianye Wu
(74) *Attorney, Agent, or Firm* — Cindy Kaplan (57) ABSTRACT

In one embodiment, a method includes receiving a request to add a prefix to memory for a route lookup at a forwarding device, the memory comprising a plurality of pivot tiles for storing pivot entries, each of the pivot entries comprising a plurality of prefixes and a pointer to a trie index, searching at the forwarding device, a dynamic pool of the pivot tiles based on a base-width associated with the prefix, allocating at least a portion of the pivot tile to the base-width and creating a pivot entry for the prefix and other prefixes with a corresponding base-width, and dynamically updating prefixes stored on the pivot tiles based on route changes to optimize storage of prefixes on the pivot tiles. An apparatus and logic are also disclosed herein.

20 Claims, 9 Drawing Sheets

United States Patent US 10,284,472 B2

DYNAMIC AND COMPRESSED TRIE FOR USE IN ROUTE LOOKUP

TECHNICAL FIELD

The present disclosure relates generally to communication networks, and more particularly, to IP (Internet Protocol) address lookup for use in forwarding network traffic.

BACKGROUND

Network routing involves look up of a destination IP address of a packet in an address table and performing a longest prefix match on the destination address against a prefix table containing a large number of entries at a very high speed. After the match is identified, the corresponding information is used to forward the packet.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving a request to add a prefix to memory for a route lookup at a forwarding device, the memory comprising a plurality of pivot tiles for storing pivot entries, each of the pivot entries comprising a plurality of prefixes and a pointer to a trie index, searching at the forwarding device a dynamic pool of the pivot tiles for an available pivot tile based on a base-width associated with the prefix, allocating at least a portion of the pivot tile to the base-width and creating a pivot entry for the prefix and other prefixes with a corresponding base-width, and dynamically updating the prefixes stored on the pivot tiles based on route changes to optimize storage of prefixes on the pivot tiles.

In another embodiment, an apparatus generally comprises a plurality of memory tiles for use in route lookup at the apparatus and comprising a pivot tile for storing pivot entries covering prefixes associated with Internet Protocol (IP) addresses, a trie tile for storing route information for the prefixes, and a next-hop tile for storing next-hop information, and a processor for comparing the route information for the pivot entries and sharing a trie tile entry for the pivot entries comprising a same position of routes in the trie tile entry and the next-hop information for the routes.

In yet another embodiment, logic is encoded on one or more non-transitory computer readable media for execution and when executed by a processor and operable to process a request to add a prefix to memory for a route lookup at a forwarding device, the memory comprising a plurality of pivot tiles for storing pivot entries, each of the pivot entries comprising a plurality of prefixes and a pointer to a trie index, search at the forwarding device, a dynamic pool of the pivot tiles for an available pivot tile based on a base-width associated with the prefix, allocate at least a portion of the pivot tile to the base-width and create a pivot entry for the prefix and other of the prefixes with a corresponding base-width, and dynamically update prefixes stored on the pivot tiles based on route changes to optimize storage of prefixes on the pivot tiles.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In modern ASIC (Application Specific Integrated Circuits), a forwarding pipeline may be arranged to support various forwarding scales depending on the position of a forwarding device (e.g., switch) in a network. In conventional ASICs, templates may need to be defined to accommodate prefix scale. Also, if base widths are statically set on memory tiles, the tiles may need to be reconfigured to account for route changes in the network.

The embodiments described herein provide software algorithms and hardware architectures to efficiently store address prefix tables in memory and process lookups at a very high speed. In one or more embodiments, a software algorithm works in tandem with hardware capabilities in a dynamic manner to accommodate varying route profiles. As described in detail below, one or more embodiments may dynamically store prefixes in a memory tile (e.g., pivot tile), providing increased flexibility for the hardware. In one or more embodiments, compression may be used for next-hop sharing logic to provide a compressed trie (compressed next-hop sets). Pivots (covering prefixes) with similar child routes may point to the same next-hop information so that trie tile entries are shared, thus providing an improvement in scalability.

Figure 1:
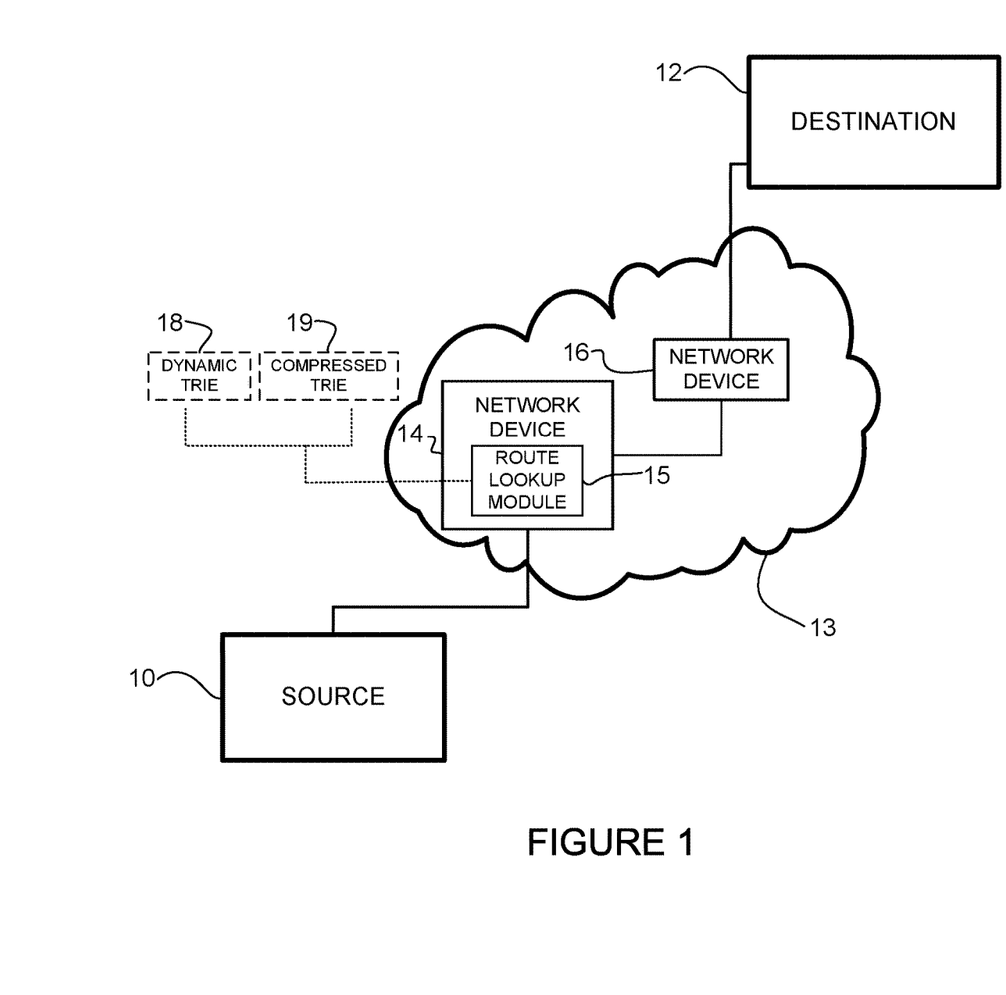
FIG. 1 illustrates an example of a network in which embodiments described herein may be implemented.

Referring now to the drawings, and first to FIG. 1, an example of a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the simplified example shown in FIG. 1, a network comprises a source 10 and destination 12 in communication over a network 13. The network path shown between the source and destination includes two network devices (forwarding devices) 14, 16. The network devices 14, 16 may comprise switches, routers, switches/routers, or other network devices comprising network routing or switching elements configured to perform forwarding functions. The network may include any number of sources, destinations, and intermediate nodes.

Packets originating from the source 10 are forwarded over the network 13 through selected network devices 14, 16 to the destination 12. Each network device 14, 16 maintains a forwarding table and a next-hop table. The forwarding table contains IP (Internet Protocol) addresses (e.g., IPv4, IPv6) of other nodes on the network, whereas the next-hop table contains addresses of directly coupled neighboring nodes. Each IP address in the forwarding table is associated with one or more next-hop addresses in the next-hop table. In one embodiment, a forwarding pipeline containing address prefix tables and next-hop information is stored in an ASIC or other IC (Integrated Circuit) device.

When a packet is received at the network device 14, the destination IP address in the packet may be looked up in memory tiles stored in the ASIC, as described in detail below. In case of multiple matches, longest matching prefix information is used. In one embodiment, a combination of hash lookup and trie lookup may be used to find the longest prefix match utilizing memory tiles.

The network device 14 shown in FIG. 1 includes a route lookup module 15. The route lookup may be used to find host routes or longest prefix match routes, for example. In one embodiment, the route lookup module 15 comprises one or more of a dynamic trie 18 and compressed trie 19 (e.g., software, firmware, code, logic, hardware) operable to store address prefixes and next-hop information for use in a lookup performed for forwarding packets from the source 10 to destination 12. The dynamic trie 18 and compressed trie 19 may comprise one or more software algorithms (e.g., logic, code) and hardware architecture (e.g., memory tiles stored in ASIC) for configuring a device for varying route profiles. A lookup may be performed, for example, for a destination IP address contained in a packet received at network device 14 for a next-hop IP address of network device 16. Network device 16 may also comprise a route lookup module 15. As described in detail below, prefixes and next-hop information may be stored on any number of memory tiles comprising, for example, one or more pivot tile, trie tile, and next-hop tile.

The term "memory tile" or "tile" as used herein refers to any table or data structure or portion, section, or group of memory on an ASIC or other memory device for storing parts of a lookup table including entries associated with routes, addresses, adjacency information, and the like. More specifically, the terms "pivot tile", "trie tile", and "next-hop tile" as used herein refer to a portion of memory reserved for storing specific types of entries (e.g., covering prefix (pivot), trie indices, adjacency indices).

As described below, the term "pivot" as used herein refers to a covering prefix (e.g., parent prefix (node) or root of subtree, address (prefix) that covers or includes other addresses (prefixes)). The term "prefix" as used herein refers to a network or route prefix. The term "base-width" as used herein refers to a prefix (or pivot) length (bit-length of prefix) and may be associated with a mask. The prefix may be associated with an IPv4 (Internet Protocol version 4) or IPv6 (Internet Protocol version 6) address, for example.

It is to be understood that the network devices and topology shown in FIG. 1, and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Those skilled in the art will understand that any number of nodes, devices, links, etc. may be used in the computer network and that the topology shown in FIG. 1 is a simplified topology. Thus, network nodes may be used in any suitable network topology, which may include any number of servers, virtual machines, switches, routers, endpoints, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
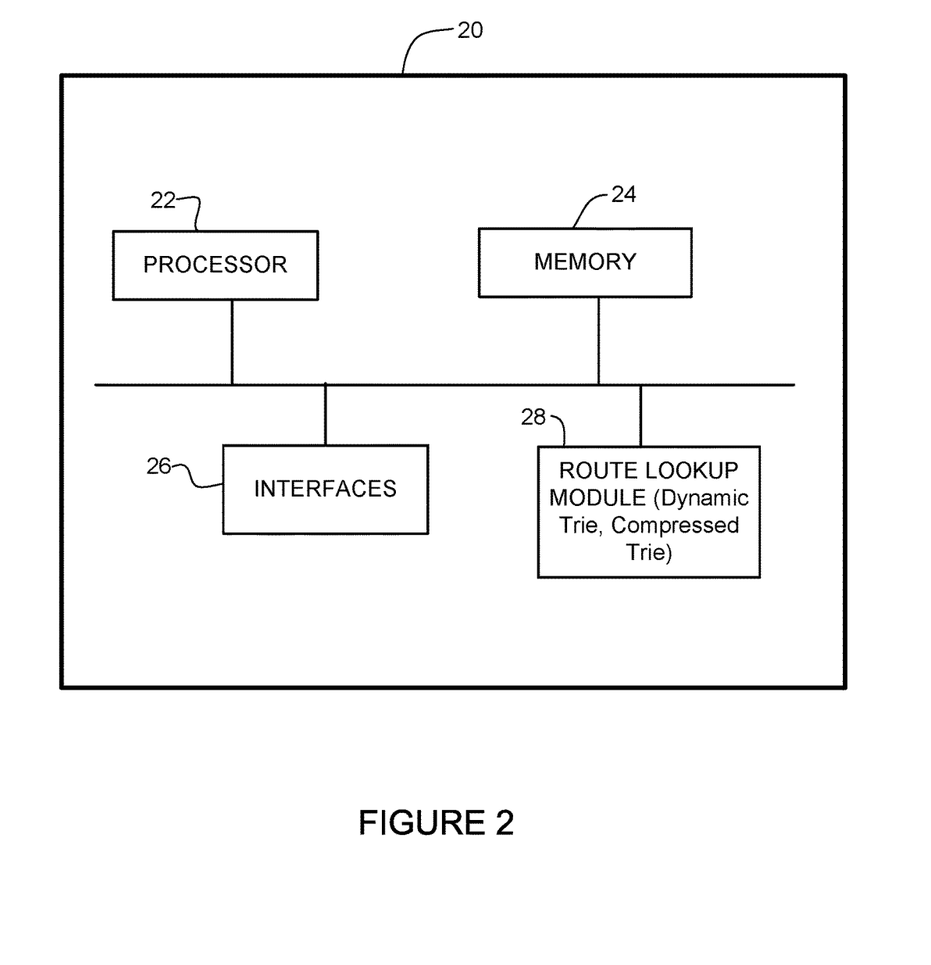
FIG. 2 depicts an example of a network device useful in implementing embodiments described herein.

FIG. 2 illustrates an example of a network device (e.g., forwarding device) 20 that may be used to implement the embodiments described herein. In one embodiment, the network device 20 is a programmable machine that may be implemented in hardware, software, or any combination thereof. The network device 20 includes one or more processor 22, memory 24, network interfaces 26, and route lookup module 28. The network device 20 may include any number (e.g., one or more) integrated circuits (e.g., ASICs), which may include one or more components shown in FIG. 2 (e.g., memory, processor (microprocessor)).

As described in detail below, the route lookup module 28 comprises any combination of memory, code, logic, software, or firmware operable to provide a dynamic trie, compressed trie, or dynamic and compressed trie for use in route lookup (e.g., IP address lookup).

Memory 24 may be a volatile memory or non-volatile storage, which stores various applications, operating systems, modules, and data for execution and use by the processor 22. For example, components of the route lookup module 28 (e.g., code, logic, database, etc.) may be stored in the memory 24. Memory 24 may include, for example, one or more address prefix table, forwarding table, next-hop sharing database, storage for adjacency information, reference count (number of pointers), or any other data structure for use in routing or forwarding packets, or storing data using the dynamic or compressed trie embodiments described herein. Memory 24 may comprise any number of memory tiles (pivot tiles, trie tiles, next-hop tiles) as described below with respect to FIG. 3. The network device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described below with respect to the flowcharts of FIGS. 4, 5, 6, 7, 8, and 9. The network device 20 may include any number of processors 22.

The network interfaces 26 may comprise any number of interfaces (linecards, ports) for receiving data or transmitting data to other devices. The network interface 26 may include, for example, an Ethernet interface for connection to a computer or network.

It is to be understood that the network device 20 shown in FIG. 2 and described above is only an example and that different configurations of network devices may be used. For example, the network device 20 may further include any suitable combination of hardware, software, algorithms, processors, memory, devices, components, or elements operable to facilitate the capabilities described herein.

Figure 3:
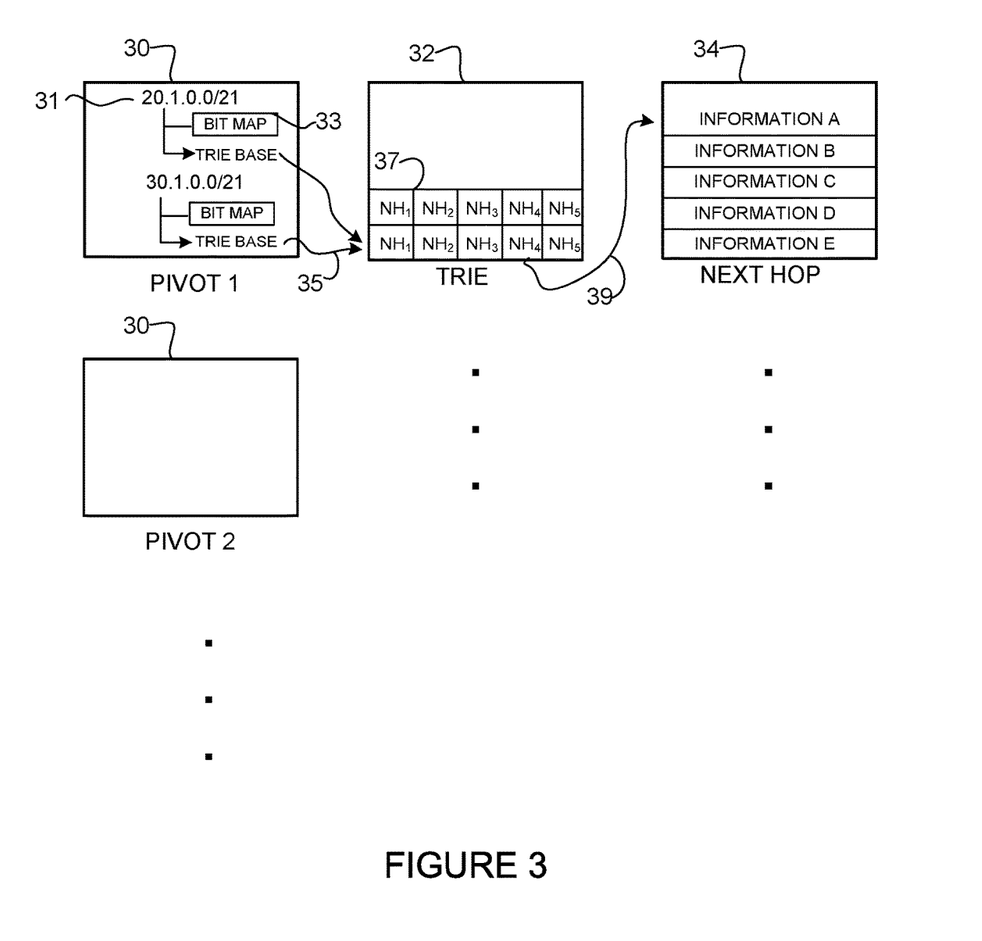
FIG. 3 is a schematic illustrating pivot, trie, and next-hop tiles for use in performing a route lookup, in accordance with one embodiment.

FIG. 3 illustrates an example of a forwarding pipeline that may be used in the route lookup process described herein. In one example, a forwarding pipeline on an ASIC is split into stages. A route lookup function in the ASIC may comprise three or four stages, for example. The lookup table may be broken up into smaller portions referred to as tiles. Chain lookups through tiles may be allocated to a specific forwarding entry type (e.g., IP LPM (IPv4, IPv6), ECMP, Adjacency). Each stage may comprise one or more tiles 30, 32, 34. Each tile may store the prefixes of only a certain range of prefix lengths. In a first stage, prefixes are compressed and stored with a covering prefix (referred to herein as a pivot) on a pivot tile 30. The pivot tile 30 stores pivot entries corresponding to one or more prefix entries associated with an IP address. A pivot entry comprises a covering prefix (pivot) 31, sub-tree members 33, which may be enumerated as individual bits in a bitmap based on position, and one or more pointers 35 to an index in a second stage 32, referred to as a trie index (trie tile). The trie is basically a prefix tree. One or more pivot values may be selected to divide prefixes evenly into groups. The tree bitmap contains a bitmap of the sub-trie and a pointer for next-hop, and a bitmap for a head pointer to a block of child nodes (routes) 37 on the trie tile 32.

In the second stage, the prefixes that are present in the sub-tree have their net-hop pointers enumerated with the trie index as the base offset. The trie tile 32 stores child route information of the prefix entries in the pivot tile. The second stage includes pointers 39 to adjacency indices that contain rewrite information (e.g., information A, information B, information C, information D, information E, etc.) in a third stage (referred to as a next-hop tile) 34. The next-hop tile 34 stores adjacency (next-hop) information. If the route includes ECMP (Equal Cost Multi-Path), there may be another stage interposed between the second and third stages in which the next-hop pointers pick up the ECMP indices. There may be any number of pivot tiles 30, trie tiles 32, and next-hop tiles 34.

In one embodiment, the number of pivots that are needed on the pivot tiles 30 are optimized based on a traffic profile (referred to herein as dynamic trie and described below with respect to the flowcharts of FIGS. 4, 6, and 7). In another embodiment, compressed logic is used for next-hop sharing so that multiple pivots may point to the same row comprising next-hop information on the trie tile (referred to herein as compressed trie and described below with respect to the flowcharts of FIGS. 5, 8, and 9).

In one embodiment, one or more prefixes may be stored in TCAM (Ternary Content-Addressable Memory) and then moved to the pivot tile 30 when a utilization threshold has been reached at the TCAM. The embodiments described herein provide an optimization process so that an optimum efficiency (e.g., maximum gain in storage) is achieved by moving the storage of pivots with a large number of entries from the TCAM to the pivot tile 30.

In one example, a routing table may include a plurality of prefixes (network prefixes) and corresponding next-hop information as shown in TABLE I below:

TABLE I

| PREFIX | NEXT-HOP |
|---|---|
| 20.1.1.0/24 | $NH_1$ |
| 20.1.2.0/24 | $NH_2$ |
| 20.1.3.0/24 | $NH_3$ |
| 20.1.4.0/24 | $NH_4$ |
| 20.1.5.0/24 | $NH_5$ |

These prefixes may be stored under a single pivot 20.1.0.0/21, as shown in FIG. 3. As noted above and described in detail below, the prefixes (e.g., covering prefixes, sub-trees) may be dynamically stored and updated on the pivot tile 30 based on current route profiles.

Another pivot entry, 30.1.0.0/21 may correspond to the prefixes shown below in TABLE II:

TABLE II

| PREFIX | NEXT-HOP |
|---|---|
| 30.1.1.0/24 | $NH_1$ |
| 30.1.2.0/24 | $NH_2$ |
| 30.1.3.0/24 | $NH_3$ |
| 30.1.4.0/24 | $NH_4$ |
| 30.1.5.0/24 | $NH_5$ |

In the above examples, the pivots for prefixes 20.1.0.0/21 and 30.1.0.0/21 share the same next-hop information. Compression may therefore be used for the next-hop sets and each pivot may point to the same trie base row as shown in FIG. 3, and described further below.

Figure 4:
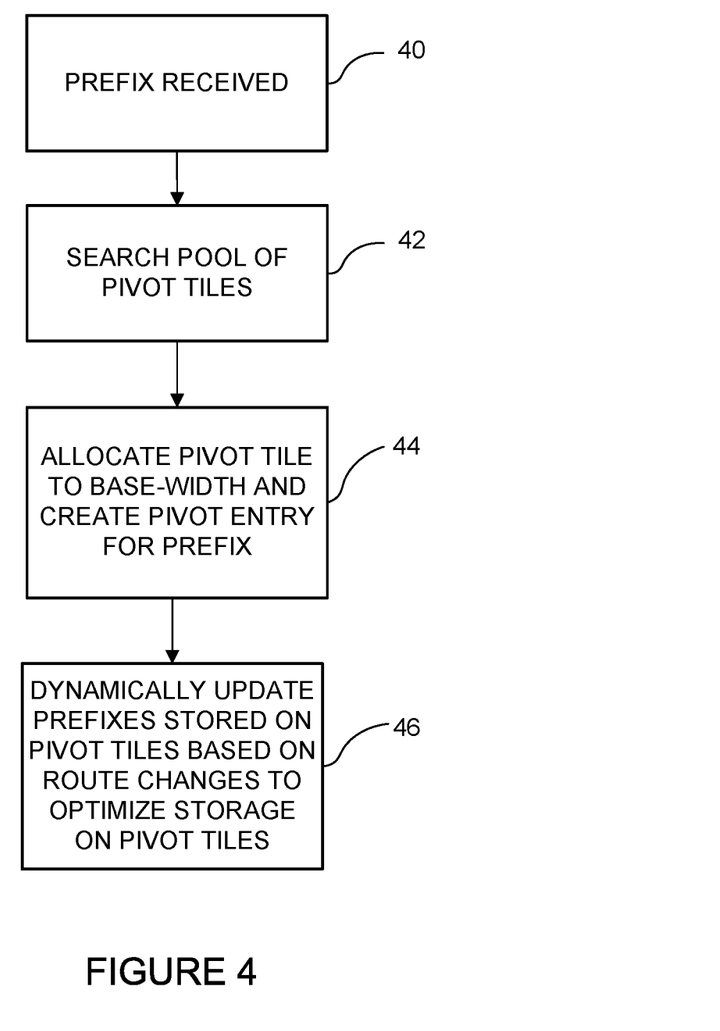
FIG. 4 is a flowchart illustrating an overview of a process for dynamic storage of prefixes in the pivot tile of FIG. 3, in accordance with one embodiment.

FIG. 4 is a flowchart illustrating an overview of a process for storing route information in a dynamic trie, in accordance with one embodiment. At step 40, prefixes corresponding to routes in the network are received at a network device (e.g., forwarding device 14 in FIG. 1). The routes may be learned dynamically. In one example, a request may be received to add a prefix to memory for a route lookup at the forwarding device. As described above with respect to FIG. 3, the memory may include a plurality of memory tiles for storing pivot entries, a trie index, and a next-hop index. Prefixes are dynamically selected for efficient storage in the pivot tiles 30 (FIG. 3). This may include, for example, searching a dynamic pool of pivot tiles 30 for an available pivot tile based on a base-width (step 42) (FIG. 4). If a pivot tile is available based on a search of the dynamic pool of pivot tiles, a tile (or at least a portion of the pivot tile) may be allocated to the base-width (step 44). A pivot entry is created on the available pivot tile for the prefix and other prefixes with a corresponding mask (base-width). In one embodiment, all elements in TCAM with a corresponding base-width may be moved onto the pivot tile. The prefixes stored on the pivot tile may be dynamically updated based on route changes to optimize storage on the pivot tile (step 46). For example, new prefixes may be added to the pivot tile or prefixes may be deleted from the pivot tile if no longer needed. Memory (pivot tiles) may therefore be adjusted for varying route profiles.

Figure 5:
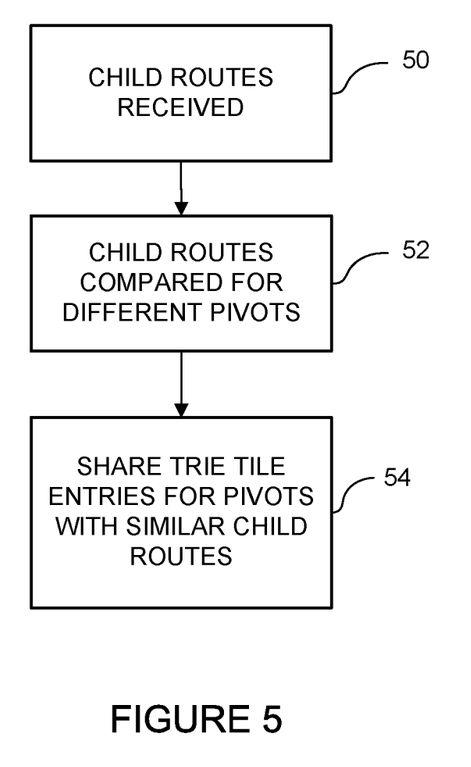
FIG. 5 is a flowchart illustrating an overview of a process for trie compression with next-hop sharing, in accordance with one embodiment.

FIG. 5 illustrates an overview of a process for utilizing compression for next-hop sharing, in accordance with one embodiment. Route information (e.g., child route information) is received at step 50. The child routes are compared to see if prefixes (pivot entries) have similar child routes (step 52). For example, if the position of child routes is the same and next-hop information for the child routes is the same, the child routes may be considered to be similar. Rather than allocating a new trie tile entry, the trie tile information is shared for two or more pivot entries with similar child routes (step 54).

The following describes details of example implementations of the embodiments described above with respect to FIGS. 3, 4, and 5.

Referring again to FIG. 3, in one example of a hardware implementation, there may be a constraint for the stages (tiles) 30, 32, 34 to be enumerated sequentially across forwarding blocks. The first stage in the hardware may be laid out as tiles each of capacity C (e.g., C equal to 8K, 16K, or any other size) pivot entries. If a memory tile is used for prefix length range [x:y] then x is its base-width. The memory tile may maintain a register to unmask most significant x bits of the packet IP address and mask the remaining bits. For example, if the memory tile is responsible for matching prefixes for lengths between 24 and 27, then the base mask register unmasks the most significant 24 bits of the address and masks the least significant 8 bits. In one embodiment, the value after applying the mask may be used as a key to a hash function. The hash function may return a value that may be used as an index into the memory tile. After the data from the memory tile is available, the masked IP address used for hashing may be compared with the IP address in the memory tile. If there is a match, it ensures that at least x bits of the IP address match. The trie may be used to find if there is a match for the remaining bits. For example, for a memory tile configured for 24 to 27 prefix lengths, if the most significant 24 bits match, bits 25, 26, and 27 may be extracted from the packet IP address and used to perform a trie lookup. If there is a match, a pointer to the information associated with the longest matching prefix may be used to index into the next-hop table.

In one embodiment, once a base-width is set on a tile, the pivots of only that mask length are available for programming. This implies that when there are T such tiles (e.g., T equal to 8, 12, or any other number depending on the layout), there can only be a limited number of pivot tiles. Given the prefix distribution, a challenge is to fit in the maximum number of pivots, given the minimal number of hash collisions. In one embodiment, a small scratchpad TCAM (Ternary Content-Addressable Memory) may be used with the following algorithm.

In one example, a pivot may cover prefixes that are three additional levels deep in the hardware. In one example, the following notations may be used:
Depth-0 (P)------------------------->Pivot
Depth-1 (P0) (P1)
Depth-2 (P00) (P01) (P10) (P11)
Depth-3 (P000) (P001) (P010) (P011) (P100) (P101) (P110) (P111)

A simplified layout of a pivot entry in a pivot tile is as follows (see also, example of Pivot Tile 1 in FIG. 3):
Pivot Entry:
(a) Bit sequence to indicate child routes (e.g., 16 bits maximum)
(b) TrieBase Pointer→Base entry in trie tile that has next-hop information for child routes In one example, the pivot entry may be associated with child routes:
10.1.1.1/32→ADJ1
10.1.1.2/32→ADJ2
10.1.1.5/32→ADJ3

In this example, the pivot may be selected as 10.1.1.0/29. In one example, the pivot layout in the hardware may be as follows (in a tile with a base-width of 29):
Pivot Entry: 10.1.1.0
(a) Bit Sequence: 000000000100110
(b) Trie Base pointer: 0x200008 (Row identifier in trie tile)

In this example, the trie tile may include four rows reserved for each pivot entry and information for four next-hops per each row, as follows:
NULL NULL NULL NULL
NULL NULL NULL NULL
NULL NULL ADJ3 NULL
NULL ADJ2 ADJ1 NULL→Row 0x200008

In one embodiment, as many routes as possible are packed in the tiles of the hardware (with the route order learned dynamically). The tiles do not need to be associated with any base-width initially. Tile base-widths may be chosen dynamically as prefixes are learned and TCAM thresholds are reached for each prefix length. There is no need to define a template for accommodating a prefix scale.

The following describes an example of an algorithm for efficient storage of prefixes in pivot tiles for dynamic trie, in accordance with one embodiment.

In one example, initializations may be performed as follows:
(1) Initialize all pivot tiles to be part of dynamic pool of tiles with base-width available "−1".
(2) Initialize software hash/d-left tables as needed (hash table split into d-separate tables).
(3) Define TCAM_THRESHOLD_MASK per prefix length (if TCAM is used as scratchpad for prefixes). When this threshold is reached for prefixes of a given prefix-length in TCAM, migration to pivot tiles may take place.
(4) Initialize a histogram database.
(5) Initialize a tile database that has occupancy percentage, etc.
(6) Initialize TILE_THRESHOLD. If pivot tile occupancy goes below this number, prefixes covered by the pivot may be moved to TCAM and pivot tile given a base-width of "−1" moved to dynamic free pool.

Figure 6:
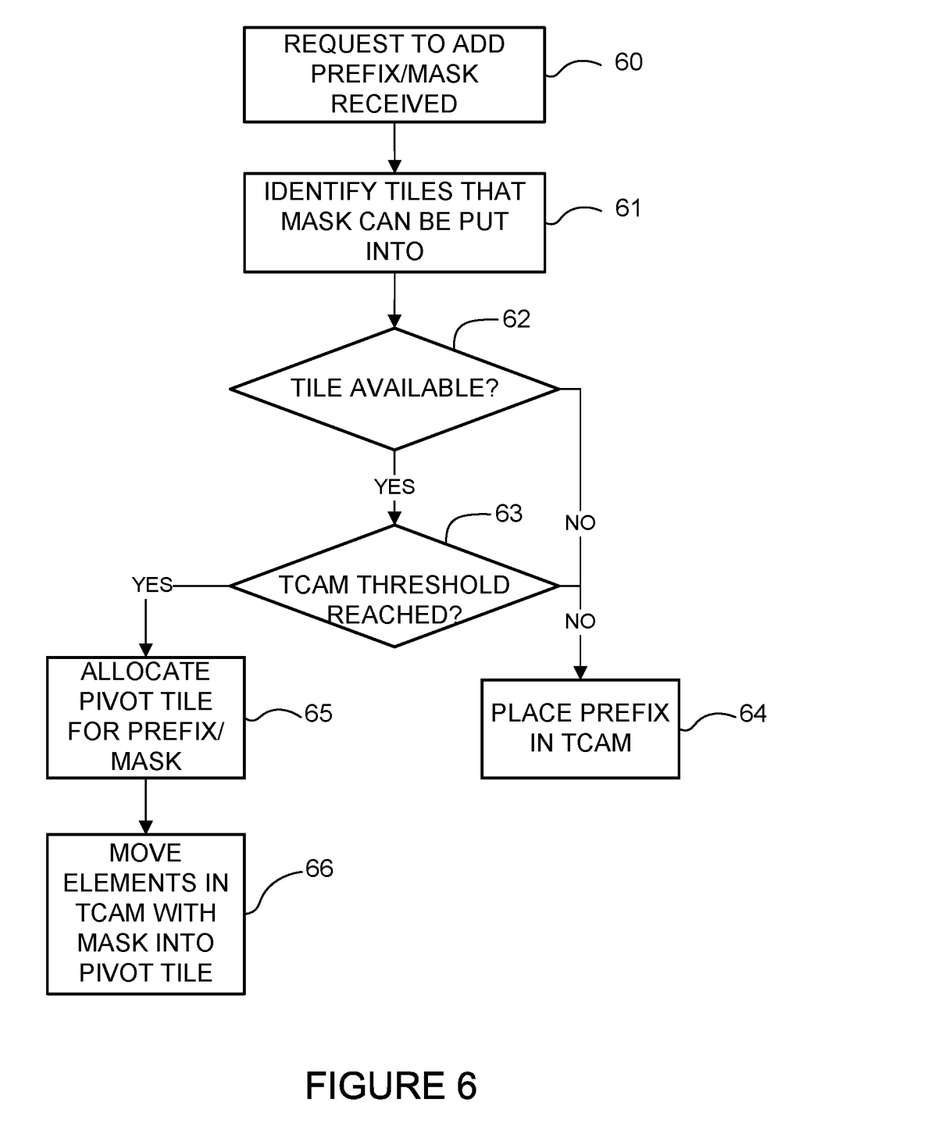
FIG. 6 is a flowchart illustrating details of a process for adding a prefix in a dynamic trie, in accordance with one embodiment.

FIG. 6 is a flowchart illustrating details of a process for dynamic trie, in accordance with one embodiment. As previously described one or more dynamic trie embodiments allow pivot tile base-widths to be chosen dynamically when prefixes are learned and TCAM thresholds are reached for each prefix length (if TCAMs are used for storage). At step 60, a request for adding a prefix/mask (P/M) is received. The possible tiles that the mask (M) can get into are identified (step 61). In one pivot tile configuration, a pivot covers prefixes that are three additional levels deep in the hardware. Thus, the mask may potentially get into tiles that have a base-width of M−3, M−2, M−1, or M (preferably in that order). This order is chosen to provide maximum occupancy. As described below, different depth levels may be used in which case the base-width may be M−K, where K is the depth of the hardware lookup available for a specific address family.

If no such tiles are available or there is no space in the dynamic pool of pivot tiles (step 62), or if the specified TCAM threshold (TCAM_THRESHOLD_MASK(M)) has not been reached (step 63), the prefix (prefix/mask) is placed into TCAM (step 64). If the TCAM threshold has been reached (step 63) and if a tile exists in the dynamic pool of pivot tiles (i.e., pivot tile is free and not yet associated with any base-width) (step 62), the pivot tile is allocated with the base as (M−3) (or placed in one of the tiles with ordered preference of tile with base-width M−3, M−2, M−1) (step 65). All elements in TCAM with mask M (same base-width) may then be moved into the pivot tile provided hash collisions do not occur (step 66).

Figure 7:
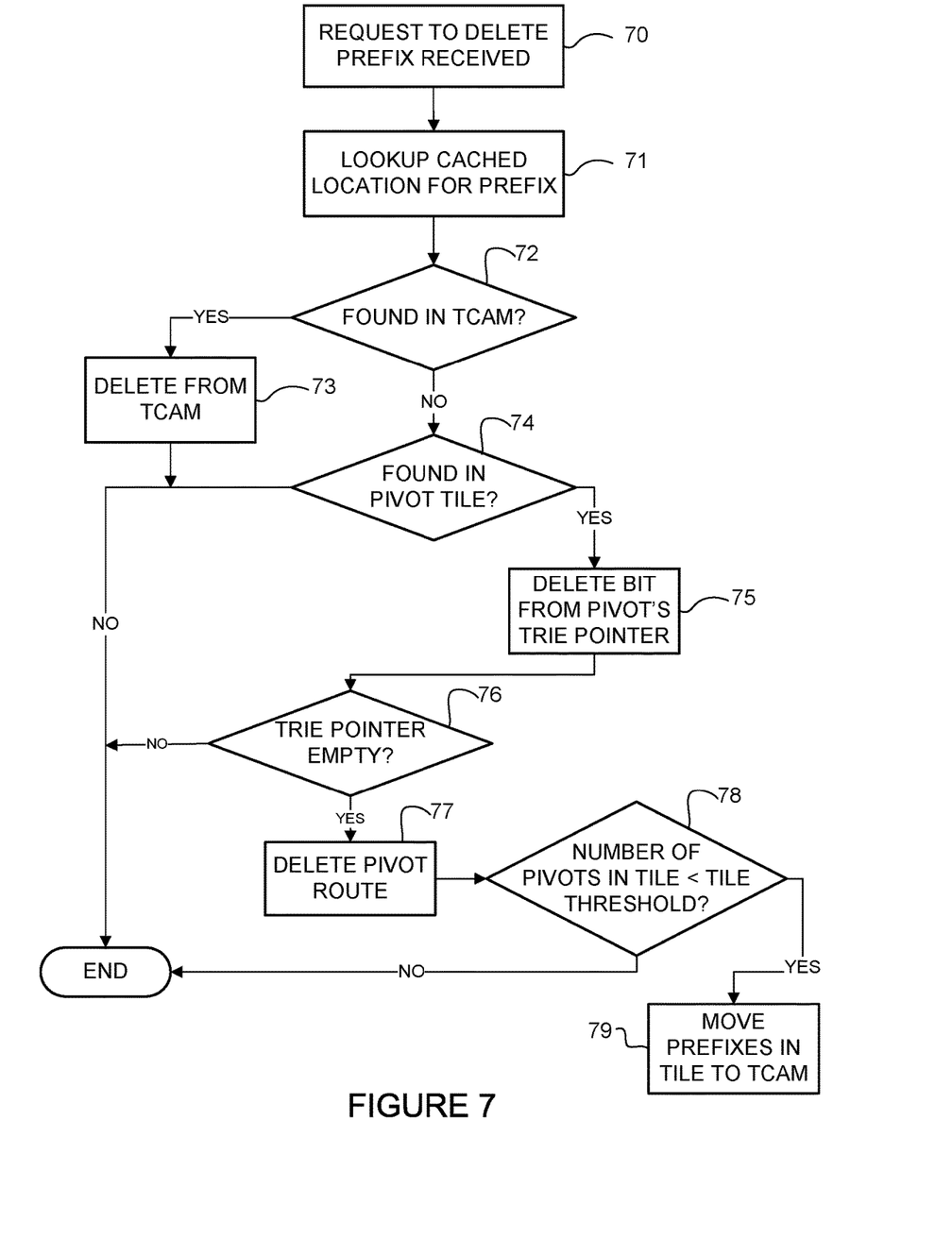
FIG. 7 is a flowchart illustrating details of a process for deleting a prefix in the dynamic trie, in accordance with one embodiment.

FIG. 7 illustrates an example of a process for deleting a prefix (prefix/mask) in dynamic trie, in accordance with one embodiment. At step 70, a request to delete a prefix is received. A lookup for a cached location of the prefix is performed (step 71). If the prefix is found in TCAM, the prefix is deleted from TCAM (steps 72 and 73). If the prefix is found in a pivot tile, the bit from the pivot's trie-pointer is deleted (steps 74 and 75). If the trie-pointer is now empty (step 76), the pivot route is deleted (step 77). If the total number of pivots in that tile is less than a tile threshold (TILE_THRESHOLD), all of the prefixes in the pivot tile are moved to TCAM to free up the tile (steps 78 and 79).

As described above with respect to FIG. 5, a compression process for next-hop sharing may be used to provide a compressed trie. Pivots with similar child routes (i.e., position of child routes are same and next-hop information for child routes are same) point to the same next-hop information so that trie tile entries may be shared. The process may include computing hash of child next-hops, taking care of collisions, maintaining an additional software database (e.g., next-hop sharing database) and refcounting (reference counting) (storing number of pointers). The compressed trie may be used in combination with the dynamic trie embodiments described herein or on its own. The following describes details for next-hop sharing logic in accordance with one embodiment.

In one example, the following new set of child routes are to be inserted:
22.1.1.1/32→ADJ1
22.1.1.2/32→ADJ2
22.1.1.5/32→ADJ3

If 22.1.1.0/29 is selected as a pivot, the pivot layout in the hardware may be as follows (in a tile with base-width 29):
Pivot Entry: 22.1.1.0
(a) Bit Sequence: 000000000100110
(b) Trie Base pointer: 0x20000C (Row identifier in trie tile)

In this example, the trie block (tile) may include four rows reserved for each pivot entry and information for four next-hops per each row, as follows:
NULL NULL NULL NULL
NULL NULL NULL NULL
NULL NULL ADJ3 NULL
NULL ADJ2 ADJ1 NULL→Row 0x20000C Pivots 22.1.1.0/29 (shown above) and 10.1.1.0/29 (previously shown above) have similar routes (i.e., position of child routes are the same and next-hop information for child routes are the same). Rather than allocating a new trie tile entry and storing similar information, trie tile information may be shared. In this example, the pivot 22.1.1.0/29 trie base pointer may be 0x200008 (as used for 10.1.1.0/29) instead of 0x20000C.

Figure 8:
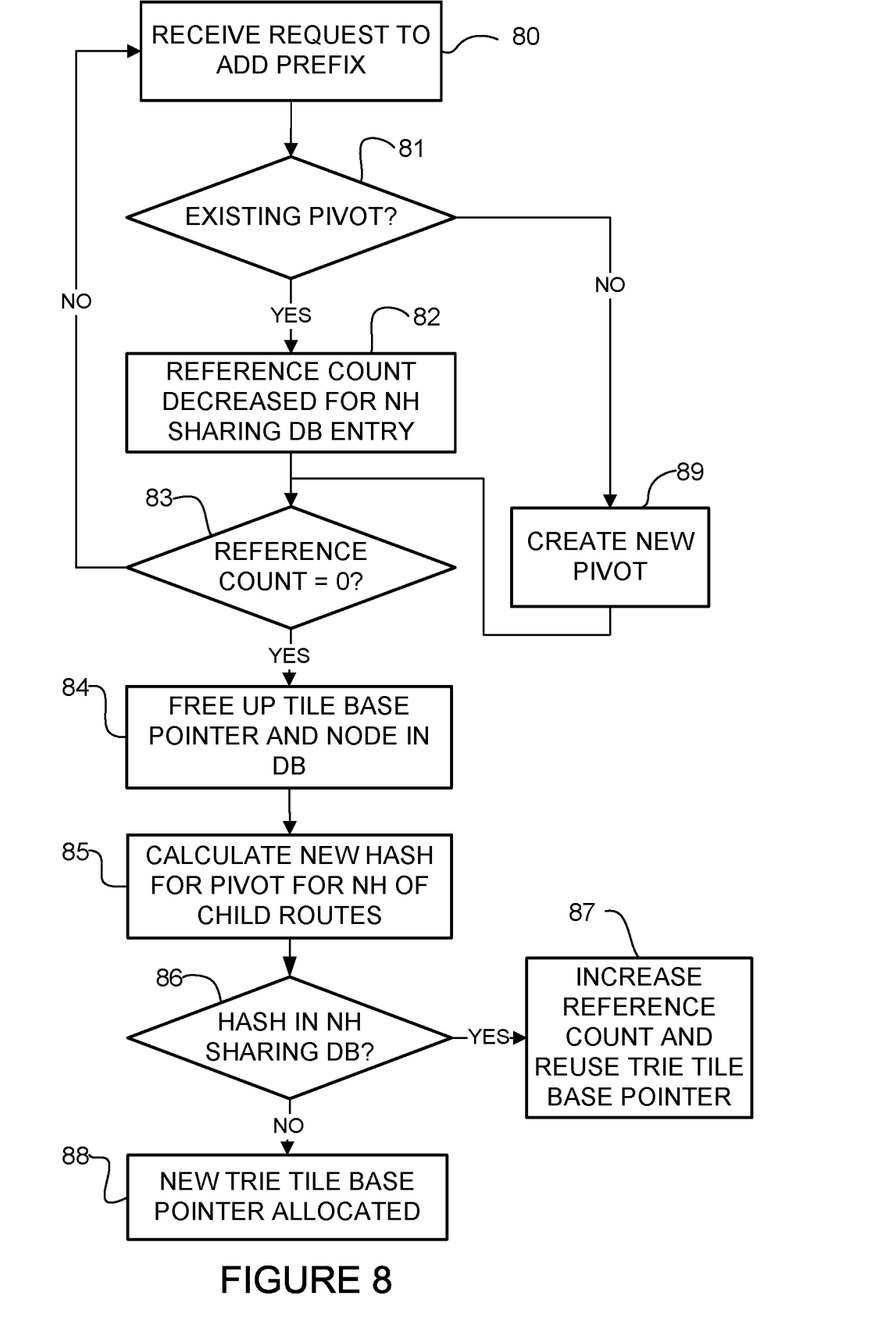
FIG. 8 is a flowchart illustrating details of a process for adding a prefix in a compressed trie, in accordance with one embodiment.

FIG. 8 illustrates an example of a process that may be used to add a prefix in accordance with one compressed trie embodiment. At step 80 a prefix is added for a prefix/mask (P/M). A check may be made to see if there is an existing pivot for the prefix (step 81). If a pivot exists, the refcount (reference count) is decreased for an associated next-hop sharing database entry (step 82). If refcount is zero (step 83), the tile base pointer is freed up as a final step to support make before break and the associated node is freed up in the database (step 84). With a new child route in place, a new hash is calculated for the pivot to cover next-hops of child routes (step 85). A search may then be performed to see if a hash exists in the next-hop sharing database (step 86). If a hash exists, the refcount is increased and the trie tile base pointer reused (step 87). If a hash does not exist, a new trie tile base pointer is allocated to create a new node in the next-hop sharing database and initialized with hash and the refcount is set to 1 (step 88). If a pivot does not exist, a new pivot is created, as previously described (steps 81 and 89).

Figure 9:
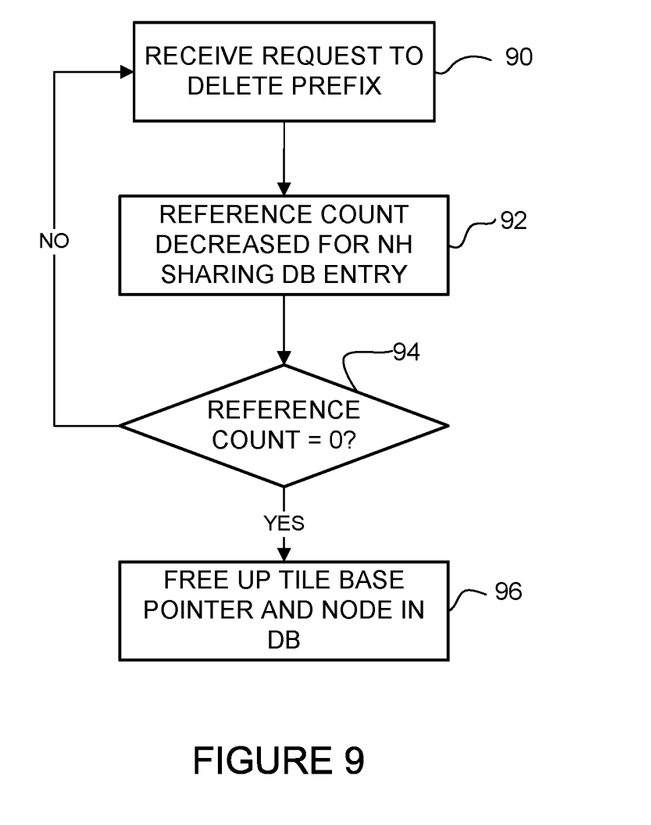
FIG. 9 is a flowchart illustrating a process for deleting a prefix in the compressed trie, in accordance with one embodiment.

FIG. 9 is a flowchart illustrating an example of a process for deleting a prefix (P/M), in accordance with one compressed trie embodiment. At step 90, a request to delete a prefix/mask is received. The refcount is decreased for an associated next-hop sharing database entry (step 92). If the refcount is now zero (step 94), the tile base pointer is freed up as the final step to support make before break (step 96). The node is also freed up in the database. This process may be particularly advantageous with leaf-spine architectures in which the next-hop sets look very similar. This process helps to free up more tiles for the pivots and hence increase route scalability.

It is to be understood that the flowcharts shown in FIGS. 4, 5, 6, 7, 8, and 9, and described above are only examples and that steps may be added, combined, removed, or modified, without departing from the scope of the embodiments.

As noted above, different depth levels may be used for different addresses. For example, for IPv6 the hardware may allow for a 5-deep lookup. The process described above for an IPv4 address family may be used for IPv6 but with a depth of five levels. The embodiments described herein may be used with different types of addresses and varying depth levels.

As can be observed from the foregoing, one or more of the embodiments described herein may provide one or more advantages. For example, memory tiles do not need to be statically associated with a base-width. Instead, base-widths may be dynamically chosen when prefixes are learned. Furthermore, there is no need to define templates to accommodate prefix scale. In one or more embodiments, next-hop sharing may be used so that the trie scale may be different from the pivot scale, thus allowing for a larger route scale.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
receiving a request to add a prefix to memory for a route lookup at a forwarding device, the memory comprising a plurality of pivot tiles for storing pivot entries, each of said pivot entries comprising a plurality of prefixes and a pointer to a trie index;

searching at the forwarding device, a dynamic pool of the pivot tiles for an available pivot tile based on a base-width associated with the prefix;

allocating at least a portion of the pivot tile to said base-width and creating a pivot entry for the prefix and other of said prefixes with a corresponding base-width; and dynamically updating said prefixes stored on the pivot tiles based on route changes to optimize storage of said prefixes on the pivot tiles.

2. The method of claim 1 wherein the prefix is stored on the pivot tile after a storage threshold has been reached in TCAM (Ternary Content-Addressable Memory).

3. The method of claim 1 further comprising generating for the prefix, the pointer to an entry on the trie index.

4. The method of claim 1 wherein the memory further comprises a trie index tile for storing the trie index and a next-hop tile for storing adjacency information.

5. The method of claim 1 further comprising moving said prefixes with the corresponding base-width from temporary storage to the pivot tile.

6. The method of claim 1 further comprising receiving a request to delete a stored prefix entry.

7. The method of claim 6 further comprising deleting a bit from the trie index pointer and a pivot route for the stored prefix entry.

8. The method of claim 1 wherein allocating the pivot tile comprises programming a prefix entry at an integrated circuit.

9. The method of claim 1 wherein the trie index comprises shared next-hop logic for said pivot entries with corresponding routes.

10. The method of claim 1 wherein searching said dynamic pool of the pivot tiles comprises identifying the pivot tiles with a largest base-width first.

11. An apparatus comprising:
a plurality of memory tiles for use in route lookup at the apparatus and comprising:
a pivot tile for storing pivot entries covering prefixes associated with Internet Protocol (IP) addresses;
a trie tile for storing route information for said prefixes; and
a next-hop tile for storing next-hop information; and
a processor for comparing said route information for said pivot tile entries and sharing a trie tile entry for said pivot entries comprising a same position of routes in the trie tile entry and said next-hop information for said routes.

12. The apparatus of claim 11 wherein the processor is configured to utilize a same trie base pointer for said pivot entries sharing the trie tile entry.

13. The apparatus of claim 11 further comprising memory for storing a next-hop sharing database and a reference count for pointers.

14. The apparatus of claim 11 wherein the processor is further configured to initialize the pivot tile as part of a dynamic pool of pivot tiles.

15. The apparatus of claim 11 wherein the processor is further configured to free up a trie tile base pointer upon deleting a prefix when the pointer is no longer needed.

16. The apparatus of claim 11 wherein the processor is further configured to compute a hash for a new child route.

17. Logic encoded on one or more non-transitory computer readable media for execution and when executed by a processor operable to:
process a request to add a prefix to memory for a route lookup at a forwarding device, the memory comprising a plurality of pivot tiles for storing pivot entries, each of said pivot entries comprising a plurality of prefixes and a pointer to a trie index;
search a dynamic pool of the pivot tiles for an available pivot tile based on a base-width associated with the prefix;
allocate at least a portion of the pivot tile to said base-width and create a pivot entry for the prefix and other of said prefixes with a corresponding base-width; and
dynamically update prefixes stored on the pivot tiles based on route changes to optimize storage of said prefixes on the pivot tiles.

18. The logic of claim 17 wherein the prefix is stored on the pivot tile after a storage threshold has been reached in TCAM (Ternary Content-Addressable Memory).

19. The logic of claim 17 wherein the logic is further operable to move said prefixes covered by the pivot entry to a different memory element when an occupancy of the pivot tile falls below a specified threshold and move the pivot tile back to said dynamic pool of pivot tiles.

20. The logic of claim 17 wherein the trie index is configured to share next-hop entries for said pivot entries with corresponding child routes.

* * * * *